United States Patent

[11] 3,561,343

| [72] | Inventor | Dexter Robert Plummer |
| | | Leicester, England |
| [21] | Appl. No. | 729,975 |
| [22] | Filed | May 17, 1968 |
| [45] | Patented | Feb. 9, 1971 |
| [73] | Assignee | The Rank Organisation Limited |
| | | London, England |
| | | a British Company |
| [32] | Priority | May 18, 1967 |
| [33] | | Great Britain |
| [31] | | 23,254 |

[54] MANUALLY OPERABLE DEMAND UNITS FOR CAMERA CONTROL APPARATUS
17 Claims, 5 Drawing Figs.

| [52] | U.S. Cl. | 95/86, 95/45 |
| [51] | Int. Cl. | G03b 17/56 |
| [50] | Field of Search | 95/86, 45; 178/7.8 |

[56] References Cited
UNITED STATES PATENTS

| 2,661,672 | 12/1953 | Fairbanks | 95/86 |
| 3,164,838 | 1/1965 | Heinrich | 95/86(X) |
| 3,347,985 | 10/1967 | Barr | 95/45(X) |
| 3,437,753 | 4/1969 | Stith | 95/86(X) |

*Primary Examiner*—John M. Horan
*Assistant Examiner*—Richard L. Moses
*Attorney*—Griffin, Branigan and Kindness ABSTRACT: A manually operable demand unit, particularly for motion picture or television camera control, has a handle arranged for universal rocking movement about two mutually perpendicular axes for controlling first and second transducers to produce respective demand signals, usually indicative of required camera movements. In addition the handle is provided with a manual control element which is rotatable relative to the handle by digital pressure about the longitudinal axis of the handle, this control element being associated with a third transducer producing a respective demand signal which may, for example, be used for zooming control. The movements of the handle and of the control element can be effected by singlehanded manipulation.

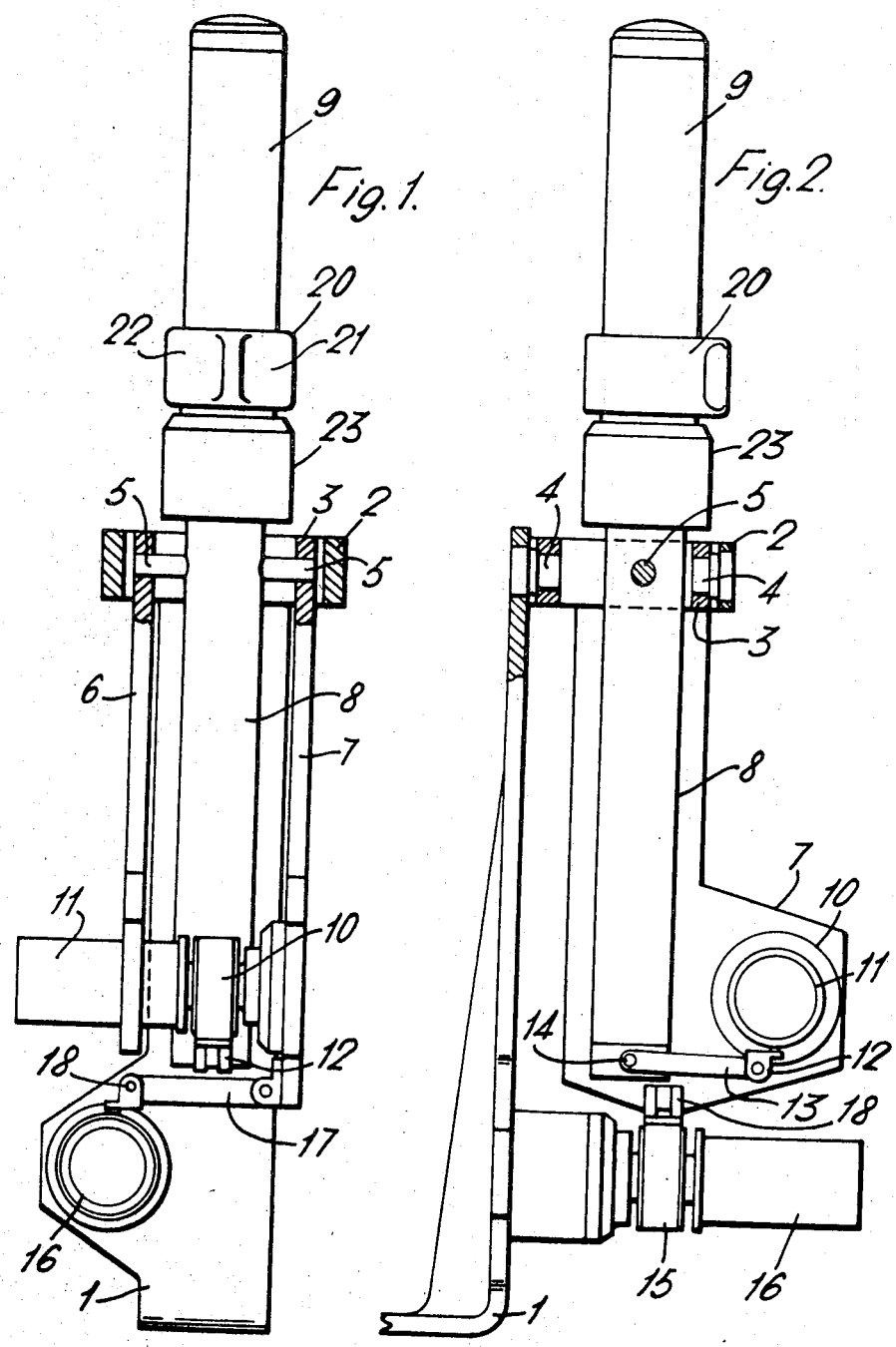

3,561,343

MANUALLY OPERABLE DEMAND UNITS FOR CAMERA CONTROL APPARATUS

The invention relates to manually operable demand units for control apparatus and is particularly advantageous for television or motion picture cameras.

Television and motion picture cameras are usually mounted on a pedestal or trolley in such a manner that the body of the camera may be easily and rapidly orientated in the required directions. For example, mechanism is usually provided for azimuthal and elevational motion, commonly known in the art as "panning" and "tilting," besides rectilinear broadside movement known as "tracking." In addition, mechanism is required to enable the operator to control one or more of the elements of the optical system; for example, it is essential to provide rapid control of the zoom elements of the objective for effecting continuous variation of the equivalent focal length. In addition, controls may be required for focusing and for diaphragm aperture sizes. Each of these operations, hereinafter also referred to as camera control functions, is required to be under the constant supervision of the operator.

The multiplicity of camera control functions and the necessity for accurate resetting to a neutral position in respect of each separate control function dictates the requirement for spatial concentration of the manual control members so as to reduce the physical and mental effort expended by the operator.

An object of the present invention is to provide an improved manual demand unit of general application but particularly advantageous for camera control, and providing increased flexibility of control by the operator over a larger number of control functions than has formerly been possible, without, however, subjecting the operator to excessive mental and physical strain. A further object is to relieve physical strain and minimize human error by combining a single manual demand unit with a greater number of servo assisted systems than has heretofore been possible. According to the invention, a manually operable demand unit for control apparatus comprises a handle and a shaft extending from said handle, said shaft being mounted for movement away from a neutral position in two opposite senses in each of at least two different modes of motion to operate a control element or elements individual to each mode of motion, the mounting being such that by singlehanded manipulation the shaft may perform a movement in any one mode alone, or simultaneously with a movement in the other mode but without reference to the magnitude or direction of said other mode of movement.

Generally, the control element is a transducer, and will determine the signal to be applied at the demand side of a servosystem. For example, the transducer may be an inductive device such as a differential transformer. Again, in another embodiment, the transducer may be a digital encoder. However in a particular embodiment where the apparatus is electrically powered the electrical control element may be the movable element of a demand potentiometer or other transducer of the servosystem, capable of converting the manual demand into a corresponding electrical demand signal for injection into the servosystem. In such a case the neutral position of the handle will correspond to the center zero position of the demand potentiometer or transducer. Rate responsive servosystems have, as is known, special advantages for camera control functions. The demand unit according to the present invention may embody automatic zero centering means for each of a number of rate responsive servosystems, for example, the unit may have a capacity for up to at least four of such systems.

In one embodiment of the invention, the demand handle has two different rate-responsive servocontrol systems, each of said systems having individual automatic resetting means to return the handle to the neutral position appertaining to the respective mode of motion. In a camera control apparatus such two modes of motion may be analogous to panning and tilting.

In a further embodiment of the invention the handle may carry a rotary control element controlling a rate-responsive servosystem for adjusting one or more movable elements, for example, of the camera objective lens. For example, the manual control handle carries a rotatable collar or bush adapted to be rotated by thumb pressure against the spring action of a center zero device for returning said element, and the movable demand potentiometer element associated therewith, to the zero position when the pressure is released.

In a still further embodiment of the invention the demand handle may be arranged to perform a further mode of motion along its longitudinal axis to control a further rate-responsive servosystem, for example, for raising and lowering the camera vertically.

In a still further embodiment of the invention, the whole of the shaft is arranged to be rotatable about its longitudinal axis to provide a further mode of control independently of the other modes.

Practical embodiments of the invention will now be described by way of example, with reference to the drawings, in which:

FIG. 1 shows an elevation in part longitudinal section of one embodiment incorporating three rate-responsive servocontrol systems.

FIG. 2 is a side elevation partly in cross section of the apparatus in FIG. 1.

Figure 4:
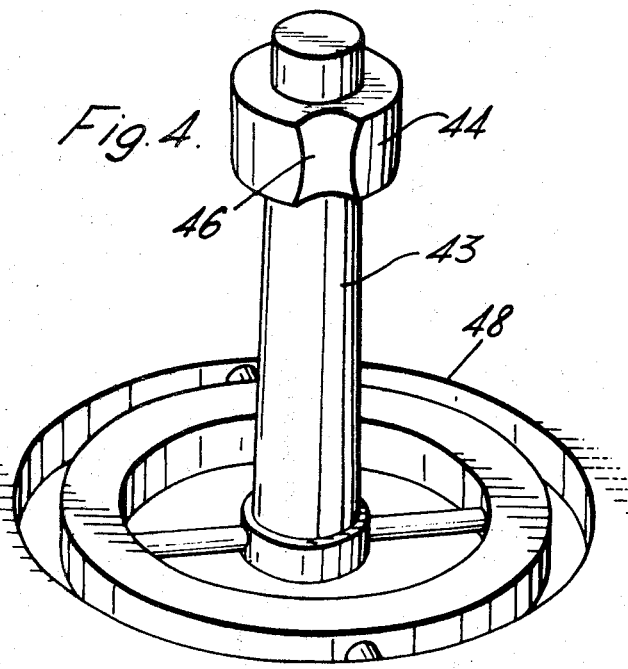
FIG. 4 is a diagram illustrating the principle of operation of the demand.
Figure 5:
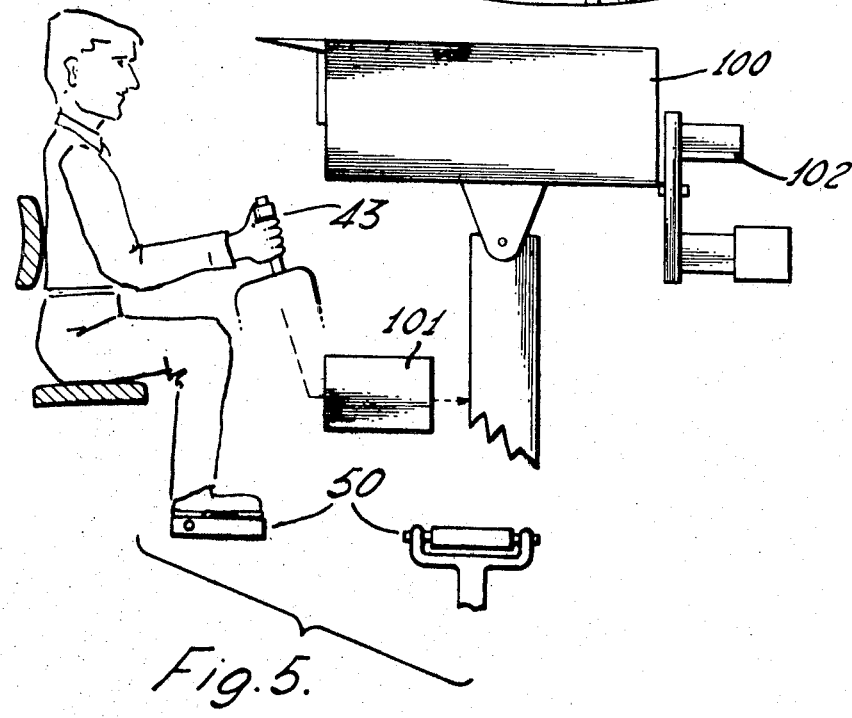
FIG. 5 illustrates the spatial arrangement of an optional pedal control for at least one control parameter.

Referring first to FIGS. 4 and 5 of the drawing, this shows part of a control system for a motion picture or television camera 100 having a joystick indicated generally at 43 which may be grasped in one hand, pan and tilt rates being demanded, by way of any suitable control system, indicated diagrammatically at 101, well known in the art, respectively by moving the joystick sideways and backwards and forwards. Zooming of the camera objective 102 can be independently controlled by way of the demand element comprising a ring or lever 44 mounted for rotation upon the joystick 43 and preferably including a cutaway portion 46 ensuring correct indexing with the operator's thumb.

A convenient gimbal arrangement allowing the joystick 43 to move sideways and backwards and forwards respectively in order to produce pan and tilt is indicated generally at 48. This arrangement is well known in the art and and is not described in detail.

In a preferred embodiment of the invention focusing of the camera is automated by a focusing device.

However, in the case where no automatic focusing is provided the solution is less ideal and the feet must be used. A demand unit allowing the feet to be used is indicated generally in FIG. 5.

The requirements of any unit including such demand elements are firstly that the operator can be seated so that the operator's feet can be used as a means of control, and secondly that the operator's own position can continuously be altered either by himself or for him to suit the camera motion.

Referring to FIG. 5 the foot demand unit conveniently demands displacement or preferably velocity along the line of sight and displacement vertically is controlled by rocking pedals pivoting about an axis parallel to the operator's collar bone. Displacement or velocity horizontally, perpendicular to the line of sight, conveniently is provided by some other movement, preferably rotation of one of the above mentioned pedals about an axis parallel to the operator's shin bone.

Again, in the case where no automatic focusing is provided, the three function control provided by the embodiment of FIG. 4 may be used for displacement of the camera, the thumb ring 44 controlling movement along the line between the operator and camera, the sideways movement of the joystick controlling sideways movement of the camera and backwards and forwards movement of the joystick controlling up and down movement.

Alternatively the camera displacements may be left/right, in/out with respect to the line of sight from camera to subject. The significance of this choice is that the first is valid where the operator gives considerable attention to his direct view of the camera, the latter when his attention is almost entirely devoted to the viewfinder. There will be certain situations where an automatic focus system will not produce the desired result; in these rare cases the focus can be controlled either by the operator (who is unlikely to need to alter the camera position in such a situation) or by another person who is available, such as for example the camera electronic operator.

Referring now to FIGS. 1 and 2, the apparatus shown therein is suitable for use as a demand unit for controlling three separate control functions in a television camera. Although the apparatus in FIGS. 1 and 2 will be described with reference to the camera functions of "panning," "tilting" AND "zooming," since these are the control functions which are most advantageously performed by rate-responsive servosystems, it will be clear form the following description that the apparatus is not limited to such use, and that other control functions can be fulfilled in an analogous manner by such apparatus.

In FIGS. 1 and 2, FIG. 1 represents a rigid bracket secured to a part of this camera support, for example, a pedestal or trolley. Bracket 1 carries an outer ring 2 rigidly secured thereto, for example, by welding, said fixed ring carrying an inner ring 3 on trunion bearings 4, whereby said inner ring together with a two-part bracket 6–7 rigidly connected thereto can rock about the axis of the trunnions 4. Within the inner ring 3 there is mounted, on trunnion bearings 5, the shaft 8 of a handle 9, which is shaped in known manner for singlehanded manipulation by the operator. Between the main members 6 and 7 of the two-part bracket, there is mounted the casing of a coaxial assembly consisting of a demand potentiometer 10 and an automatic zero-centering mechanism 11. Such assembly of demand potentiometer and center zero mechanism forms part of a rate-responsive servosystem (not shown) for controlling one of the camera functions, as will be described further below. Such demand potentiometer, the details of which are not shown here, may be of a conventional type used in servosystems and having a winding with an earthed center tap. The movable contact member of the demand potentiometer sweeps over a track of circular formation and is connected by a lug 12 and link 13 to a pin 14 at the end of the handle shaft 8. The movable contact member is also connected internally to the coaxially arranged zero-centering device 11, which will be referred to in more detail below. With the arrangement thus far described, rocking of the handle 9 and shaft 8 about the trunnion bearings 5 will move the link 13 and alter the setting of the demand potentiometer 10 away from the zero position.

Such movement of the shaft 8, the potentiometer 10 is effected against the restoring force of the zero-centering device 11, so that when the handle 9 is released, the shaft 8, and with it the link 13, and the potentiometer will be reset to the initial position shown in the drawing, such automatic resetting to zero being essential, as is well known, in rate-responsive servosystems.

The handle 9 and shaft 8 are also rockable about the trunnion bearings 4 as above described in a plane parallel to the plane of FIG. 1. Such rocking movement is arranged to set the adjusting element of a further demand potentiometer 15 which is similarly assembled coaxially with a respective automatic zero-centering device 16 associated with a further rate-responsive servo mechanism. The assembly 15–16 of potentiometer and automatic zero-centering device is similar in construction to the assembly 10–11 above referred to, but the casing of the potentiometer 15 is mounted rigidly to the fixed bracket 1. An articulated connection is made between the bracket member 7 and the movable element of the potentiometer 15 through a link 17 and lug 18. The potentiometers 10 and 15 may be associated respectively with rate-responsive servosystems for tilting and panning movements.

Demand potentiometers of the rotary zero center type are already well known and the potentiometers in 10 and 15 above mentioned may follow well-known design principles. Automatic zero-centering devices are also well known in the servocontrol art. The construction of the zero-centering devices 11 and 16 will, therefore, not be referred to in detail in this specification, but for the purpose of an understanding of the present invention, it will suffice to indicate that a shaft (not shown) actuated by link 17, and carrying the adjustable member of the potentiometer 15, will extend coaxially within the fixed casing of the zero-centering device 16. Around such rotatable shaft, there will be arranged a pair of clock-type torsion springs suitably anchored at one end to the said rotatable shaft, and at the other end to a sleeve fixed to the casing of the device 16. Such torsion springs are arranged to have a position of rest in which the adjustable element of the potentiometer 15 is in its earthed central zero position. The springs act in opposite senses so as to oppose respectively the demand setting of the movable element of the potentiometer 15 away from its zero position in opposite directions so that, when hand pressure is released from the handle 9, the handle and the potentiometer will both be reset to zero by the springs. In an alternative arrangement an intermediate sleeve may be provided between the central or coaxial movable shaft of the demand potentiometer and the fixed casing of the device 16 and the torsion springs may be anchored respectively, the one between the coaxial shaft and the intermediate sleeve, and the other between the intermediate sleeve and the external fixed casing, suitable angular steps being provided to limit the rotary movement of the demand potentiometer in opposite directions from the center zero position.

The apparatus shown in FIGS. 1 and 2 also includes elements of a further rate-responsive servosystem for controlling a third camera control function, preferably for controlling the zoom elements of the objective system. The manually operative element of such third system is a ring 20 rotatable with respect to the handle 9 and having a pair of depressions 21 and 22 for engagement by the thumb of the operator for turning the ring in two opposite positions away from the zero position shown in FIG. 1. The apparatus of FIGS. 1 and 2 will normally be mounted to the camera frame so that the handle 9 and its shaft 8 are horizontal and with the depressions 21 and 22 uppermost and symmetrical with respect to the axis. The adjusting ring 20 is connected to the movable element of a demand potentiometer, which together with an automatic zero-centering device (not shown) is assembled inside the bushing 23. The details of such demand potentiometer and zero-centering device are not here described in detail since they are functionally equivalent to and operate in the same manner as the potentiometer and zero-centering devices already described with reference to FIGS. 1 and 2 for controlling the bodily movements of the camera in the panning and tilting modes. In the U.S. Pat. No. 3,347,985 to J. D. Barr et al., assigned to the assignees of the present application, there is described a rate-responsive servocontrol system for control of the zoom elements of an objective system comprising a control ring rotatable with respect to a handgrip, and having an automatic zero-centering device. The control ring 20 and zero-centering device shown in FIGS. 1 and 2 may operate in a manner analogous to that described in the above named U.S. patent, and will, therefore not be described in detail herein.

Whilst the camera control apparatus described above with reference to FIGS. 1 and 2, is adapted to control three separate camera functions, two of which are bodily movements, and the third of which control zoom elements of the objective, it may be desirable to provide further rate-responsive servosystems in respect of other camera control functions. One such example of apparatus is indicated diagrammatically in partial longitudinal section in FIG. 3.

Figure 3:
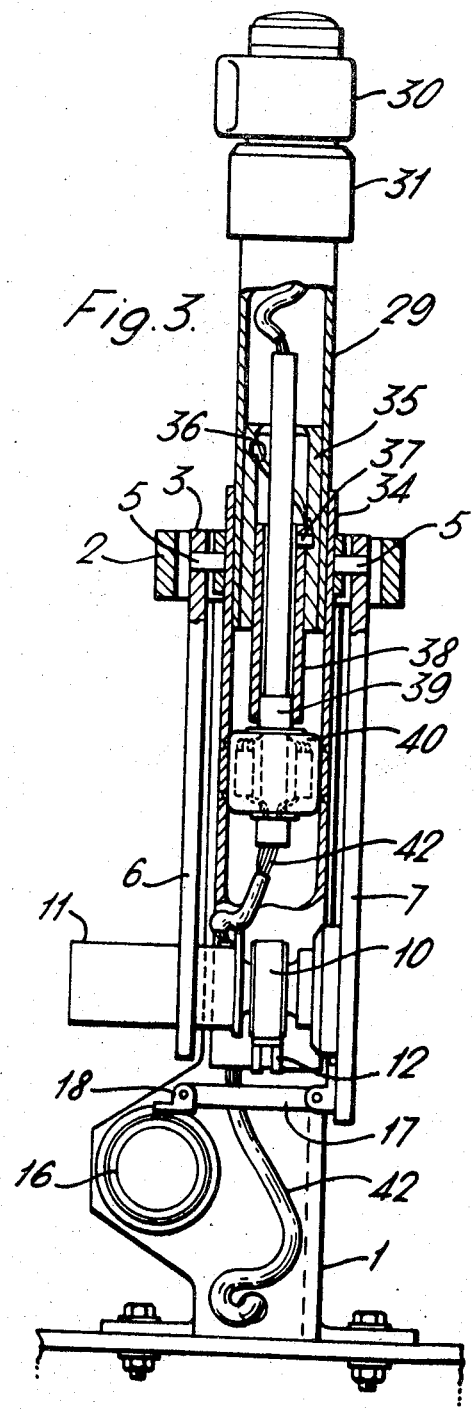
FIG. 3 is a view partly in longitudinal section generally similar to FIG. 1 of a different embodiment wherein means are provided for performing an additional control function.

In this apparatus, those elements belonging to the rate-responsive servosystems for panning and tilting are indicated by the same reference characters as those used in FIGS. 1 and 2. In FIG. 3, however, the handle 29, unlike the arrangement in FIGS. 1 and 2, is normally arranged to be in the vertical position. Accordingly, the the control ring 30 and the appertaining potentiometer and zero-centering device are mounted in the bushing 31 at the top of the handle for convenience of digital control, when the operator's hand is in the natrual position for grasping the handle In addition to the three camera control functions already mentioned in the description, with reference to FIGS. 1 and 2, the apparatus in FIG. 3 incorporates elements of a further rate-responsive control system for effecting vertical bodily movement of the entire camera, i.e. parallel to the axis of the a handle 29. To effect this type of control, the operator raises and lowers the handle 9 vertically to set the demand potentiometer of the rate-responsive control system. The handle 29 is axially slideable within the hollow tubular shaft 34, which itself is capable of performing the pivotal movements in two different planes in a manner analogous to that already described with reference to FIGS. 1 and 2. Rigidly mounted within the hollow handle 30 is an internal sleeve 35 having an internal helical groove 36 forming a track for a pin 37 carried by a helical strip 38. Strip 38 is fixed at the bottom to a bush 39, which, in turn, carries the movable element of a demand potentiometer 40, said movable element, together with the handle 29, being biased into the center zero position by an automatic spring operated zero-centering device of the general type above described (not shown in detail). The electrical harness leading from the potentiometer 40 and from the potentiometers 10 and 15 in FIG. 3 is indicated at 42.

In operation, when the handle 29 is moved in a vertical direction with respect to the sleeve to set the demand potentiometer 40, the rate-responsive servosystem responds in the well-known manner to elevate the camera bodily at a constant rate, depending on the demand setting of the potentiometer.

It is clear from the description of the elements of the apparatus in FIG. 3, that the four camera control functions therein described may be performed by singlehanded manipulation of the handle and of the control ring.

In alternative embodiments of the invention, the servodemand potentiometers may be replaced by inductive devices such as differential transformers, or digital encoders in the case where the servosystem employs pulse techniques. Alternatively, the demand units may be tachogenerators, or any other rate-sensitive device.

The invention may also be employed in connection with position-responsive servosystems, and in this case, the demand elements may also be potentiometers.

It will be appreciated that, while the invention has been described with reference to an electrical system, it is equally applicable to alternative systems, such as hydraulic control systems, and particularly hydraulic servosystems.

I claim:

1. A manually operable demand unit for control apparatus, comprising a rigid support, a handle, a shaft connected to an extending and extending from the handle, pivotal mounting means supporting the shaft from the support for universal rocking movement from a neutral position independently about two mutually perpendicular axes transverse to the longitudinal axis of the shaft, first and second respective transducers, respective linkage means operatively connecting the shaft to the respective transducers, said transducers being responsive to rocking movement of the handle about said respective axes to provide respective first and second demand signals, a manual control element movable bodily with and rotatably mounted on the handle for rotation by digital pressure about the longitudinal axis of the handle, a third transducer, and means operatively connecting the third transducer to said control element, said third transducer providing a third demand signal independently of the demand signals provided by the first and second transducers, the position of the manual control element on the handle being such that the three demand signals can be varied independently of each other by singlehanded manipulation of the handle and said control element.

2. A demand unit as claimed in claim 1, including means permitting relative movement of the handle and the shaft along the longitudinal axis of the shaft, a further transducer carried by the shaft, and means connected to the transducer and responsive to axial movement of the handle relative to the shaft to actuate the further transducer to provide a further demand signal, variable independently of the other demand signals by axial movement of the handle.

3. A demand unit as claimed in claim 1, wherein at least one of the first and second transducers is a rate-responsive transducer and including automatic resetting means for automatically resetting the handle to its neutral position with respect to the rocking movement appertaining to the respective transducer.

4. A demand unit as claimed in claim 1, wherein the third transducer is a rate-responsive transducer and including an automatic zero-centering device operatively associated with the manual control element.

5. A demand unit as claimed in claim 3, wherein at least one of the first and second transducers is a rotary transducer having an axis parallel to the respective pivoting axis of the shaft, the respective resetting means comprising a zero-centering device acting on the transducer and arranged on a common axis therewith.

6. A demand unit as claimed in claim 5, wherein one of the first and second transducers is mounted on the rigid support, the unit including a bracket which is bodily movable together with the handle about one of the pivoting axes relative to the rigid support, and wherein the respective transducer associated with said pivoting axis is mounted on the rigid support, the other transducer being mounted on the movable bracket and being connected by the respective linkage means to the shaft.

7. A demand unit as claimed in claim 1, in combination with a television or motion picture camera, including a servosystem responsive to the first and second demand signals from the first and second respective transducers to control bodily movement of the camera in two respective planes.

8. A demand unit as claimed in claim 1, in combination with a television or motion picture camera, including a servosystem responsive to the first and second demand signals from the first and second respective transducers to control panning and tilting movements of the camera respectively.

9. A demand unit as claimed in claim.1 in combination with a television or motion picture camera having an adjustable objective lens, including a servosystem responsive to the third demand signal from the third transducer to adjust one or more movable elements of the camera objective lens.

10. A demand unit as claimed in claim 2 wherein the further transducer has a rotary element and wherein the means responsive to axial movement of the handle relative to the shaft comprises a helical spring strip arranged to exert a torsional force on said rotary element when expanded and compressed in the axial direction.

11. A demand unit as claimed in claim 10, including a tubular sleeve and a plunger slidable in said tubular sleeve, one end of the helical strip sliding within the tubular sleeve and being axially compressible and expandible by axial movement of the handle, and wherein one end of the strip is constrained to move axially and the other end is connected to the rotary element of the further transducer.

12. A manually operable demand unit according to claim 1, wherein the transducers are potentiometers.

13. A manually operable demand unit according to claim 1, wherein the transducers are differential transformers.

14. A manually operable demand unit according to claim 1, wherein the transducers are digital encoders.

15. A manually operable demand unit according to claim 1, operatively associated with control apparatus which is electrically powered.

16. A manually operable demand unit according to claim 1, operatively associated with control apparatus which is hydraulically powered.

17. A manually operable demand unit according to claim 1, in combination with control apparatus and at least one foot pedal, said foot pedal being arranged to perform movements which are individual to at least one additional or optional control function of the control apparatus.